United States Patent
Blangy et al.

(10) Patent No.: US 7,251,734 B2
(45) Date of Patent: Jul. 31, 2007

(54) SECURE INTEGRATED CIRCUIT INCLUDING PARTS HAVING A CONFIDENTIAL NATURE AND METHOD FOR OPERATING THE SAME

(75) Inventors: Hugues Blangy, Neuchâtel (CH); Albin Pevec, Lendava (SI)

(73) Assignee: EM Microelectronic-Marin SA, Marin (CH)

( * ) Notice: Subject to any disclaimer, the term of this patent is extended or adjusted under 35 U.S.C. 154(b) by 493 days.

(21) Appl. No.: 10/488,001

(22) PCT Filed: Sep. 3, 2002

(86) PCT No.: PCT/EP02/09819

§ 371 (c)(1),
(2), (4) Date: Feb. 27, 2004

(87) PCT Pub. No.: WO03/025715

PCT Pub. Date: Mar. 27, 2003

(65) Prior Publication Data

US 2004/0260932 A1   Dec. 23, 2004

(30) Foreign Application Priority Data

Sep. 18, 2001   (EP)   .................................. 01203541

(51) Int. Cl.
*H04L 9/00*   (2006.01)
(52) U.S. Cl. .................... 713/189; 713/180; 713/193; 713/194; 713/300; 708/250; 708/270
(58) Field of Classification Search ................ 713/180, 713/193, 194, 189; 708/250, 270
See application file for complete search history.

(56) References Cited

U.S. PATENT DOCUMENTS 3,293,570 A * 12/1966 Nielsen ...................... 331/135

(Continued)

FOREIGN PATENT DOCUMENTS

EP        497 618 A2    8/1992

(Continued)

*Primary Examiner*—Taghi T. Arani
(74) *Attorney, Agent, or Firm*—Sughrue Mion, PLLC

(57) ABSTRACT

The secure integrated circuit (1) further includes storage means (2) in which confidential data is stored, such as an encryption programme and at least an encryption key, and a microprocessor unit (3) for executing the encryption programme. Said circuit further includes an oscillator stage (4, 5) supplying clock signals (CLK) in particular for clocking the sequence of operations in the microprocessor unit (3), and a random number generator (6) connected to the microprocessor unit. A random number (RNGosc) generated by the random number generator is supplied to the input of the oscillator stage to configure it such that the frequency of the clock signals supplied by the oscillator stage depends on said random number. The oscillator stage includes an RC type oscillator, in which a certain number of resistors and/or capacitors can be selected by the random number introduced at the input of the oscillator stage. So the frequency of clock signals depends on the RC component selected as a function of said received random number.

16 Claims, 3 Drawing Sheets

U.S. PATENT DOCUMENTS

Figure 1:
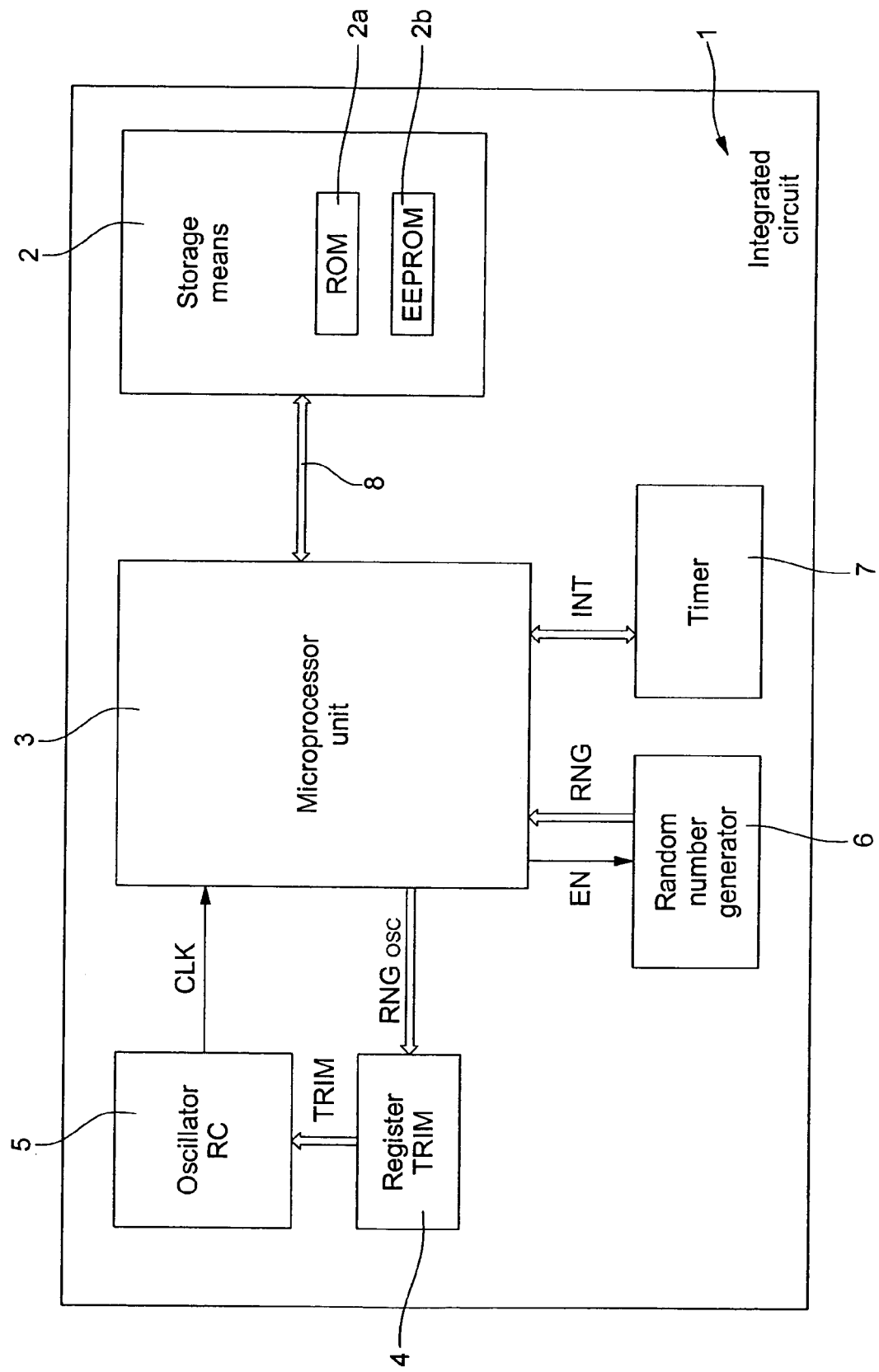

| | | | | |
|---|---|---|---|---|
| 4,575,621 | A | * | 3/1986 | Dreifus ........................ 235/380 |
| 4,764,666 | A | * | 8/1988 | Bergeron ...................... 463/25 |
| 4,855,690 | A | * | 8/1989 | Dias ............................. 331/78 |
| 5,404,402 | A | * | 4/1995 | Sprunk ........................ 713/189 |
| 5,581,615 | A | * | 12/1996 | Stern ........................... 713/180 |
| 5,781,458 | A | * | 7/1998 | Gilley ......................... 708/255 |
| 5,944,833 | A | * | 8/1999 | Ugon .......................... 713/400 |
| 6,327,661 | B1 | * | 12/2001 | Kocher et al. ............... 713/193 |
| 6,807,553 | B2 | * | 10/2004 | Oerlemans .................. 708/252 |
| 2002/0166058 | A1 | * | 11/2002 | Fueki .......................... 713/194 |

FOREIGN PATENT DOCUMENTS

| | | |
|---|---|---|
| FR | 2 784 763 A1 | 4/2000 |
| WO | WO 97 33217 A1 | 9/1997 |
| WO | WO 99 63696 A1 | 12/1999 |
| WO | WO 00 07142 A1 | 2/2000 |

* cited by examiner

SECURE INTEGRATED CIRCUIT INCLUDING PARTS HAVING A CONFIDENTIAL NATURE AND METHOD FOR OPERATING THE SAME

BACKGROUND OF THE INVENTION

The invention concerns a secure integrated circuit which includes parts of a confidential nature. The integrated circuit includes storage means in which confidential data is stored, such as an encryption programme and at least an encryption key, a microprocessor unit for executing the encryption programme, an oscillator stage supplying clock signals for clocking the flow of operations in the microprocessor unit, and a random number generator connected to the microprocessor unit. The oscillator stage is arranged to receive at least a random number produced by the random number generator so as to configure said oscillator stage so that it produces clock signals whose frequency depends on the random number received. The confidential data concerns, in particular mathematical functions to be protected, encryption programmes and personal access codes.

The invention also concerns a method for operating or activating the secure integrated circuit.

Secure integrated circuits are used particularly in specific electronic devices in which data of a confidential nature has to be protected. Said circuits can be applied for example in micro-computer units or in hard-wired logic circuits, such as badges or smart cards or within encoded data transmission fields.

Within the technical field of smart cards, such as bankcards, at least one secure integrated circuit is integrated in said card. Electric contact pads, which are connected to the integrated circuit, are made on the smart card so as to act as an interface with the read and/or write device for specific data. When the smart card is introduced into the read and/or write device, an encryption programme with an encryption key can be executed in the microprocessor unit as soon as the integrated circuit is switched on.

Usually, the execution time for the various instruction sequences of the programme, and the single frequency clock signals for clocking the operations processed in the microprocessor unit, are well defined. Consequently, unauthorised persons can fraudulently decipher several confidential data items relatively easily using encryption analysis techniques.

The analysis techniques used are for example of the DPA (Differential Power Analysis) type or the DFA (Differential Fault Analysis) type. The first of these techniques consists in measuring the amplitude of the current consumed across electric contact terminals of the integrated circuit during all the instruction sequences of the programme. This allows the single frequency of the clock signals to be found, on the one hand, and on the other hand the encryption key or keys used in the encryption programme to be found. The second technique consists in having the encryption programme executed several times and interrupting it at precise moments in order to disrupt it (determinist method). In this way, and on the basis of the good or bad calculation results obtained, it is possible to decode the encryption keys.

A person with ill intent can also analyse without too much difficulty the confidential data memory zones using a suitable test material given that the integrated circuit is usually clocked by single frequency clock signals. In order to do this, the metal pads and the protective passivation layer covering the secure integrated circuit have to be removed. After removal of the protective layers, test probes are placed on the memory zones, and several correlations between the various tested memory zones are carried out to find the stored confidential data.

Several technical solutions have already been proposed to prevent an ill-intentioned person from finding the confidential data via encryption analysis techniques. One solution consists for example in slowing down or speeding up the flow of the encryption programme using clock signals with a variable frequency. One can cite, for example, International Patent document No. WO 97/33217 which discloses a secure integrated circuit which is provided with decorrelation means for the flow of at least one instruction sequence of a main encryption programme. The integrated circuit mainly includes storage means, in which a main encryption programme and a secondary programme are stored, and a microprocessor unit connected to the storage means for operating the main programme and/or the secondary programme.

The decorrelation means of the integrated circuit include in particular an oscillator for providing internal clock signals at a constant frequency, and a random generator receiving the internal clock signals or the external clock signals via a logic selection circuit. The random number generator supplies randomly distributed pulse signals via a calibrator circuit to clock the operations in the microprocessor unit. It should be noted that the internal clock signals are non synchronised and phase shifted with respect to the external clock signals so as to allow the microprocessor unit to pass to decorrelated operation.

The decorrelation means also include a timer for providing interruption signals to the microprocessor unit to momentarily interrupt the flow of the main programme. The intervals of time between each interruption signal can be defined randomly by random numbers provided to the timer by the random number generator. Likewise, during an interruption, an interruption routine or a secondary programme may be executed so as to prevent any analysis of the integrated circuit's confidential data.

One drawback of the solution disclosed in document No. WO 97/33217 is that the internal clock signals are pulse signals at a constant frequency. Thus, the random number generator, which receives the internal clock signals, can only provide pulse signals of variable periodicity whose mean frequency is less than the internal clock signals. It should be noted that randomly distributed pulse signals are only obtained by randomly suppressing certain pulses of the internal clock signals without modifying the width of each clock pulse. In order not to slow down the sequence of operations of the main programme too much, it is thus necessary to have internal clock signals at a sufficiently high frequency, which constitutes another drawback.

SUMMARY OF THE INVENTION

The main object of the present invention is to overcome the drawbacks of the prior art by providing a secure integrated circuit having simplified means for randomly varying the time for executing the sequence of operations of an encryption programme in order to prevent encryption analysis.

The invention therefore concerns a secure integrated circuit of the aforementioned type, wherein the oscillator stage includes an RC type oscillator, and wherein a certain number of resistors and/or capacitors can be selected by the random number introduced at the input of the oscillator stage so as to generate clock signals whose frequency depends on the RC component selected as a function of said received random number.

One advantage of the secure integrated circuit according to the invention is that the oscillator stage can easily be configured using each random number received successively in order to produce clock signals with a random frequency. This allows the frequency of the clock signals for clocking the operations of the microprocessor unit to be rapidly changed. Each time that the secure integrated circuit is switched on or when the encryption programme is executed, the frequency of the clock signals will change, since the random number generator will provide a random number to the oscillator stage, said random number being different from the preceding random number generated.

Another advantage of the secure integrated circuit according to the invention is that the clock signals provided by the oscillator stage are regular rectangular pulse signals, i.e. the space between two pulses is substantially identical to the width of each pulse. Consequently, each random number provided to the input of the oscillator stage will have an equivalent influence on the width of the pulses and on the gap separating two pulses. In order to limit the use of external clock signals upon introduction, for example, of a secure smart card into a read and/or write device, the frequency of the internal clock signals is adjusted to a higher value than the frequency of the external signals.

Another advantage of the secure integrated circuit according to the invention is that a timer supplies interruption signals to the microprocessor unit in order to interrupt the sequence of operations of the encryption programme. The interruptions to the sequence of operations of the programme can be made in a random manner if the timer receives a random number from the random number generator. Moreover, each interruption signal can be provided on the basis of a certain number of pulses of the random frequency clock signals. The number of pulses counted in the timer can be dependent on the random number received by the timer. Thus, the time for executing the sequence of operations of the programme cannot be determined precisely, which prevents encryption analysis of the secure integrated circuit.

Upon reception of an interruption signal, the microprocessor unit may also execute an interruption routine between instruction sequences of the encryption programme. As soon as the interruption signal is received, the microprocessor unit can command the transmission of a random number to the oscillator stage in order for it to produce a clock signal frequency change.

The invention also concerns a method for activating the secure integrated circuit of the aforecited type, which includes the steps of:
  generating at least one random number in the random number generator,
  transmitting said random number generated to the oscillator stage, which includes an RC type oscillator, in which a certain number of resistors and/or capacitors can be selected by the random number introduced at the input of the oscillator stage,
  producing clock signals in the oscillator stage whose frequency depends on the RC component selected as a function of said random number received in order to clock the sequence of operations in the microprocessor unit.

BACKGROUND OF THE DRAWINGS

Figure 2:
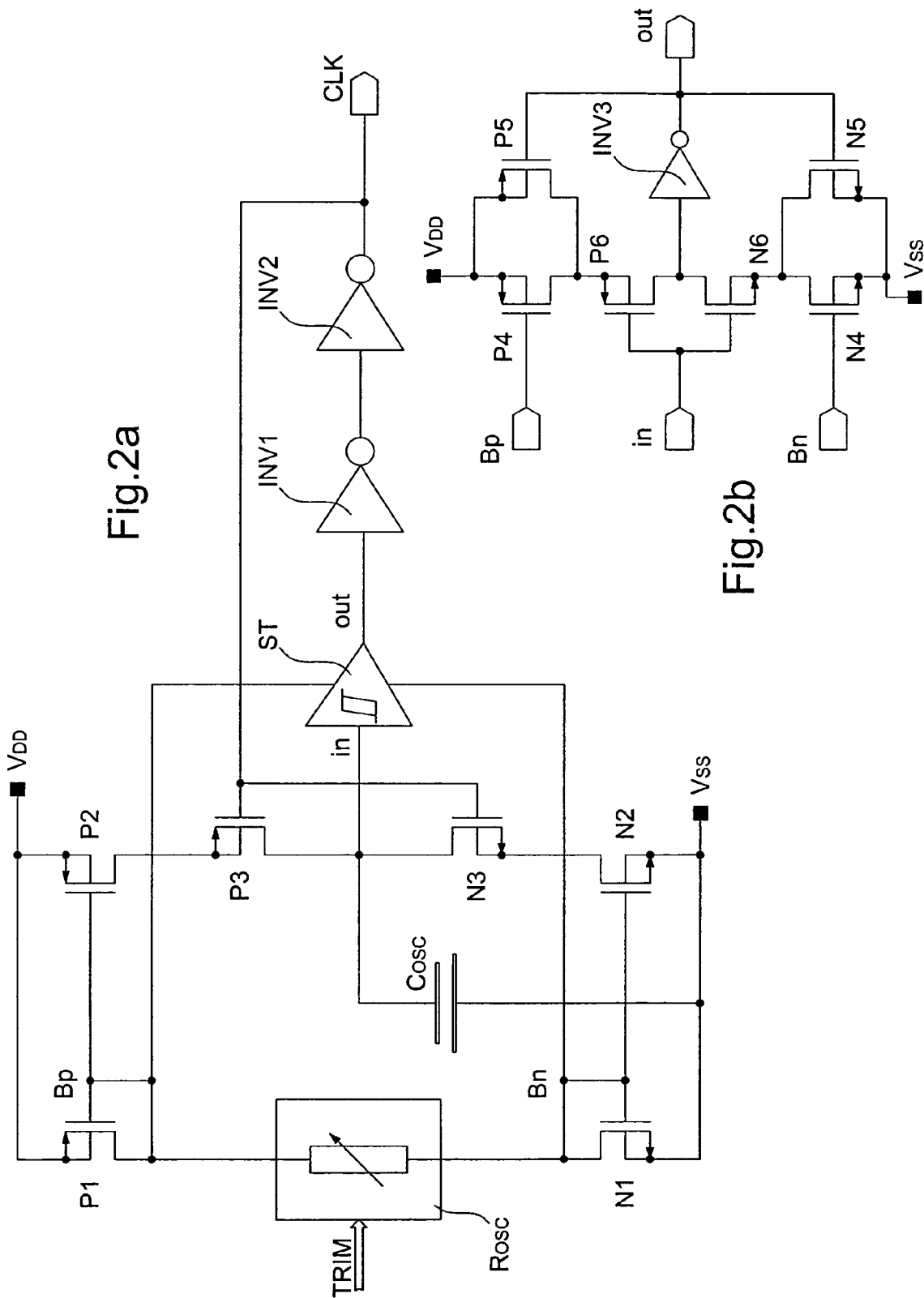
Figure 3:
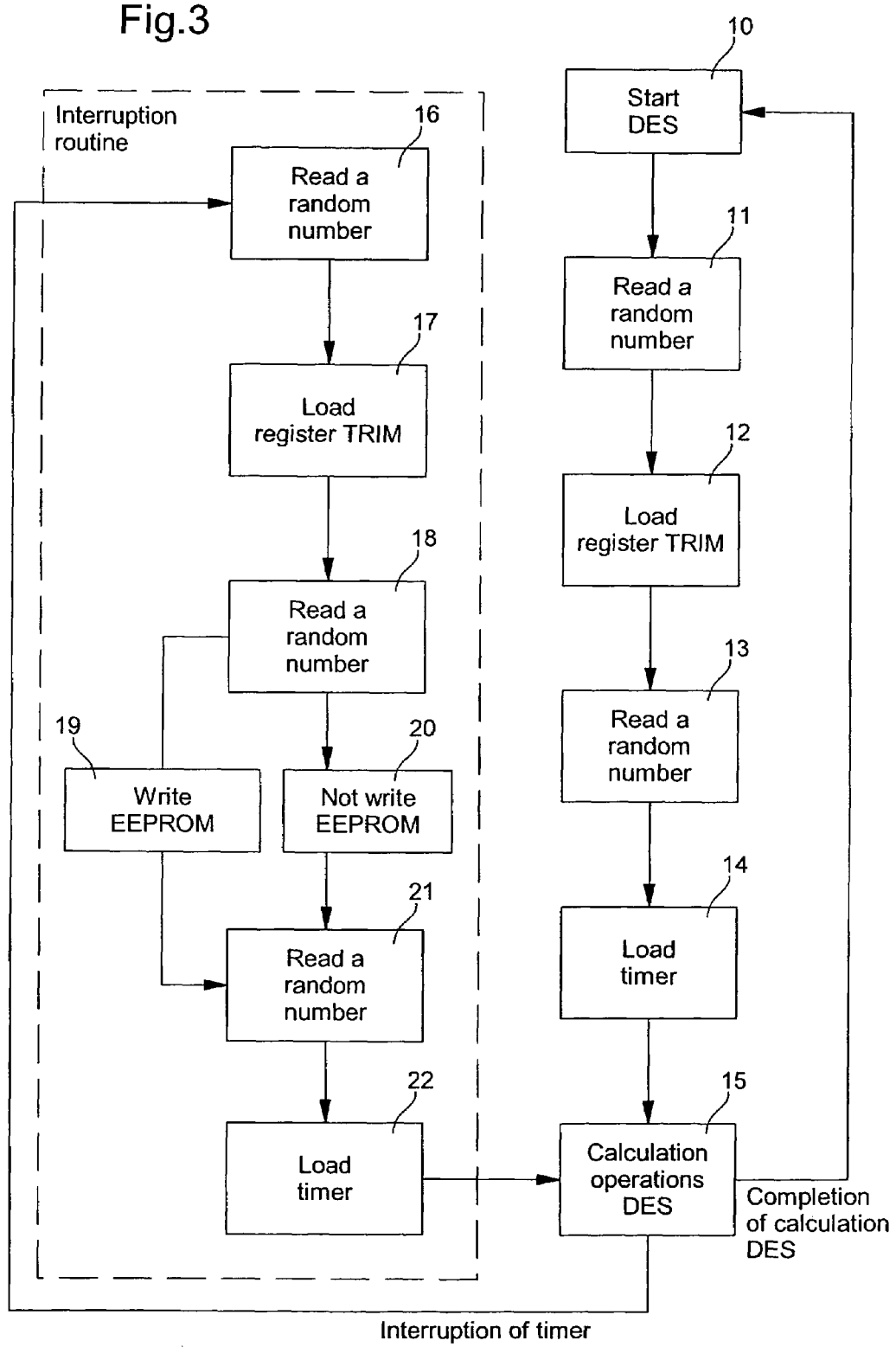

The objects, advantages and features of the secure integrated circuit will appear more clearly in the following description of embodiments illustrated by the drawings in which:

FIG. 1 shows schematically the functional units of the secure integrated circuit according to the invention, FIG. 2a shows various electronic elements forming the oscillator stage of the secure integrated circuit according to the invention, FIG. 2b shows the components of a bistable trigger circuit for generating rectangular pulse signals of the oscillator stage shown in FIG. 2a, and FIG. 3 shows a flow diagram of the sequence of operations during the execution of the encryption programme in the microprocessor unit of the secure integrated circuit according to the invention.

DETAILED DESCRIPTION OF THE DRAWINGS

The following description will not describe in detail all the components or electronic units of the secure integrated circuit which are well known to those skilled in the art in this technical field. Only the components or electronic units of the oscillator stage will be described in more detail.

The various essential units, included in the secure integrated circuit, are shown in FIG. 1. Secure integrated circuit 1 includes first of all storage means 2 in which are stored, in particular, an encryption programme and at least an encryption key, and a microprocessor unit 3 connected via a data bus 8 to the storage means, said unit allowing the encryption programme to be executed using the encryption key.

The encryption programme is, for example, a DES type algorithm well known to the experts in this technical field. This programme is stored in particular in a non-volatile ROM memory 2a. An EEPROM memory 2b is also provided in storage means 2 for storing several data items when the encryption programme is executed or for keeping confidential data, such as personal access codes or encryption keys. The encryption key or keys are used during execution of the encryption programme by the microprocessor unit. Of course, storage means 2 can include other types of memories, such as a Flash memory or a RAM type memory, not shown in FIG. 1.

The secure integrated circuit also includes a random number generator 6 connected via a bus RNG to microprocessor unit 3, and an oscillator stage which is formed of a register 4 for receiving a random number transmitted by microprocessor unit 3 via bus RNGosc, and an RC type oscillator 5 supplying clock signals CLK particularly to the microprocessor unit. Addressing, reading and/or writing of the storage means can be clocked directly by clock signals CLK or by signals originating from a clock signal control device of the microprocessor unit. The integrated circuit also includes a timer 7 intended to provide interruption signals INT to the microprocessor unit to momentarily interrupt the operations processed in said unit.

In order to prevent encryption analysis, the frequency of the clock signals CLK generated by oscillator stage 4, 5 has to be able to vary randomly. In normal operation, i.e. particularly during execution of the encryption programme, the oscillator stage can be configured by random numbers so as to generate clock signals whose frequency is within a frequency range of between 13 and 20 MHz. However, for the microprocessor unit, it is preferable for the frequency not to exceed 24 MHz. Thus, the microprocessor unit can include a clock signal control device which allows frequency divisions to be carried out for certain processed operations or the clock signals CLK to be directed to timer 7 or storage means 2.

It may still be desirable, in operating periods of the integrated circuit without execution of the encryption programme, for the frequency of the clock signals produced by the oscillator stage to be fixed at a low value, such as at 1.25 MHz. In this case, the oscillator stage is configured to produce only fixed low frequency clock signals independently of a random number introduced into the oscillator stage register. This frequency reduction saves on the current consumed by the integrated circuit. Likewise, in order to reduce consumption in certain operating periods of the secure integrated circuit, the random number generator and/or the timer can be momentarily deactivated.

The frequency variation can occur each time the circuit is switched on, during execution of the encryption programme in the microprocessor unit, or upon reception of an interruption signal in the microprocessor unit, or each time a random number is supplied from random number generator 6. Oscillator 5 which forms said oscillator stage will be explained in more detail hereinafter with reference to FIGS. 2a and 2b.

Random number generator 6 is usually used for example in the authentification processes of the circuit or for encryption functions. The generator, well known in this technical field, can be formed of an independent non-synchronised oscillator of the oscillator stage, of a pseudo-random counter clocked by the non-synchronised clock signals, and an output register connected to the counter for providing random numbers at each loading pulse. The non-synchronised clock signal frequency is within the range of 30 to 90 kHz.

The random numbers generated by the generator are binary words, which can be limited to 8 bits. Via a read instruction EN from the microprocessor, the random numbers are first of all transmitted to the microprocessor unit via the random number bus RNG. Next, the microprocessor unit transmits via bus RNGosc at least one received random number in order to load, particularly, register 4 of the oscillator stage for the frequency variation of clock signals CLK.

The supply of successive random numbers to register 4 of the oscillator stage can be controlled by the microprocessor unit, in particular during the encryption programme executing period in said unit. Microprocessor unit 3 may also transmit all the received random numbers to register 4.

In an embodiment that is not shown, the oscillator stage can receive successively random numbers which originate directly from the random number generator.

Timer 7 is clocked by the clock signals whose frequency varies as a function of a random number provided in register 4 of the oscillator stage. After a certain number of clock pulses CLK received via microprocessor unit 3, the timer produces an interruption signal which it sends via bus INT to microprocessor unit 3 in order to momentarily interrupt the operations processed in said unit.

Timer 7 can also receive random numbers via microprocessor unit 3 such that the interval between two interruption signals varies in a random manner. It may be imagined that a random number introduced into the timer influences the number of received clock signals CLK which trigger an interruption signal. Consequently, the interruptions are provided randomly to the microprocessor unit.

Thus the interruptions of the encryption programme in the microprocessor unit also allows to prevent a person to find out the confidential data of the secure integrated circuit. For example at least 16 interruptions and at the most 32 interruptions of the encryption programme executed in the microprocessor unit can be provided.

As will be explained with reference to FIG. 3, it is also provided that, during an interruption to the encryption programme, an interruption routine is executed in the microprocessor unit. This routine randomly adds instruction sequences in the interrupted encryption programme, which prevents an execution time of the executed programme from being precisely defined. Moreover, variations in the current consumed during execution of the encryption programme and interruption routine are produced by randomly imposing data storage or reading of the storage means. Consequently, encryption analysis for example of the DPA type cannot be carried out to find the confidential content of the secure integrated circuit which constitutes an object to be achieved by the integrated circuit of the present invention.

The oscillator stage will now be explained in more detail with reference to FIGS. 2a and 2b. This stage is connected to a regulated voltage source between two potential terminals Vdd and Vss. Potential Vdd has a value lower than 3 V, preferably 2.8 V, whereas potential Vss has a value of 0 V, which corresponds to the earth terminal of the integrated circuit.

The RC type oscillator of the oscillator stage includes a set of resistors Rosc. A binary word TRIM originating from the oscillator stage register configures this set of resistors. This binary word corresponds to a random number placed in said register.

The set of resistors is arranged to place a certain number of resistors that can be selected in parallel or in series owing to switching elements such as NMOS or PMOS transistors that are not shown. The gate of each transistor can be controlled by a voltage as function of binary word TRIM received from the register so as to make the corresponding transistor conductive or non conductive, and to connect resistors in parallel or in series. The resistor value chosen by binary word TRIM determines with a capacitor Cosc the frequency value of clock signals CLK generated at the oscillator output.

The configured set of resistors Rosc allows current sources to be generated in a first current mirror connected to a positive potential terminal Vdd, and in a second current mirror connected to a negative potential terminal Vss. Said set is thus placed in series between the two current mirrors.

The first current mirror includes a first PMOS transistor P1 and a second PMOS transistor P2, as well as a fourth PMOS transistor P4 which will be explained with reference to FIG. 2b. Gate Bp and the drain of first transistor P1 are connected to a positive terminal of set of resistors Rosc, and the source of transistor P1 is connected to terminal Vdd. The gate of second transistor P2 is connected to the gate Bp of first transistor P1, and the source of the second transistor P2 is connected to the terminal Vdd. The drain of the second transistor is connected to the source of a third PMOS transistor P3.

The second current mirror includes a first NMOS transistor N1 and a second NMOS transistor N2, as well as a fourth NMOS transistor N4 which will be explained with reference to FIG. 2b. Gate Bn and the drain of first transistor N1 are connected to a negative terminal of set of resistors Rosc, and the source of transistor N1 is connected to terminal Vss. The gate of second transistor P2 is connected to the gate Bn of first transistor N1, and the source of the second transistor N2 is connected to the terminal Vss. The drain of the second transistor N2 is connected to the source of a third NMOS transistor N3.

The third transistors P3 and N3 each have their drain connected to a positive terminal of a capacitor Cosc, whose negative terminal is connected to Vss. The gates of these two third transistors P3 and N3 are connected to each other. If the potential of gates P3 and N3, connected to the output of clock signals CLK, is close to Vdd, transistor P3 is non conductive, whereas transistor N3 becomes conductive to allow the current duplicated from the second current mirror to pass. Capacitor Cosc is thus discharged owing to the current duplicated in the second current mirror dependent on set of resistors Rosc. If the potential of the gates of transistors P3 and N3, connected to the output of clock signals CLK, is close to Vss, transistor N3 is non conductive, whereas transistor P3 becomes conductive to allow the current duplicated by the first current mirror to pass. Capacitor Cosc is thus charged owing to the current duplicated in the first current mirror dependent on set of resistors Rosc.

It will be understood that the signals, originating from the charging and discharging of capacitor Cosc, are triangular signals. It is thus indispensable to convert the triangular signals into rectangular pulse signals. This conversion is carried out in particular by a bistable trigger circuit ST or Schmitt trigger circuit. The input in of this circuit ST is connected to the positive terminal of capacitor Cosc, as well as to the drains of transistors P3 and N3, whereas the output out of this circuit ST is connected to two inverters in series INV1 and INV2. Clock signals CLK with substantially rectangular pulses are provided at the output of second inverter INV2. It is to be noted that a certain signal transition delay between output out and output CLK is achieved owing to the two inverters INV1 and INV2.

The output out of Schmitt trigger circuit ST is at the high state when capacitor Cosc is discharged. In this case, transistor N3 is conductive, whereas transistor P3 is non conductive so that the current duplicated by the second current mirror discharges capacitor Cosc. This discharging of Cosc is carried out until the potential of said capacitor Cosc reaches a first low threshold level detected by circuit ST at input in. As soon as the potential of capacitor Cosc has reached the first threshold level, the output out of circuit ST passes to the low state. From this instant, the transition of signals at output out of circuit ST imposes a transition of clock signals CLK from the high state to the low state.

The passage of clock signals CLK from the high state to the low state will allow transistor N3 to be blocked and transistor P3 to be opened in order to charge capacitor Cosc using the current duplicated in the first current mirror. Capacitor Cosc will thus be charged until the potential of said capacitor Cosc reaches a second high threshold level detected by circuit ST at input in. As soon as the potential of capacitor Cosc has reached the second threshold level, output out of circuit ST passes to the high state. From this instant, the transition of the signals at output out of circuit ST imposes a transition of clock signals CLK from the low state to the high state.

FIG. 2b shows Schmitt trigger circuit ST. The fourth PMOS and NMOS transistors P4 and N4 have their gates respectively connected to gate Bp of the first current mirror, and to gate Bn of the second current mirror. The source of fourth transistor P4 is connected to terminal Vdd, whereas the source of fourth transistor N4 is connected to terminal Vss. The drain of transistor P4 is connected to the source of a sixth PMOS transistor P6 to provide it with the current duplicated in the first current mirror, whereas the drain of transistor N4 is connected to the source of a sixth NMOS transistor N6 to provide it with the current duplicated in the second current mirror.

Transistors P6 and N6 have their gates respectively connected to input in of the Schmitt trigger circuit, and their drains connected to the input of a third inverter INV3. The output of third inverter INV3 is connected to output out of the Schmitt trigger circuit, as well as to the gate of a fifth PMOS transistor P5 and to the gate of a fifth NMOS transistor N5. The source of fifth transistor P5 is connected to terminal Vdd, whereas its drain is connected to the source of sixth transistor P6. The source of fifth transistor N5 is connected to terminal VSS, whereas its drain is connected to the source of sixth transistor N6.

When output out passes to the high state, transistor P5 is blocked, whereas transistor N5 is conductive. Consequently, the input of inverter INV3 is at the low state since transistors N6 and N5 are conductive in capacitor Cosc's discharging phase. The potential applied to input in of circuit ST decreases linearly in capacitor Cosc's discharging phase. When the potential at input in of circuit ST is close to Vdd/2, transistor P6 becomes conductive allowing the current duplicated in the first current mirror to pass. However, since transistor N5 is fully conductive, it totally absorbs the well-defined current provided by transistor P6 through conductive transistor N6. Thus, the potential at input in could decrease as far as the first low threshold level defined approximately by the threshold voltage of transistor N6 before output out passes from the high state to the low state.

When output out passes to the low state, transistor N5 is non conductive, whereas transistor P5 is conductive. Consequently, the input of inverter INV3 is at the high state since transistors P6 and P5 are conductive in capacitor Cosc's charging phase. The potential applied to input in of circuit ST increases linearly in capacitor Cosc's charging phase. When the potential at input in of circuit ST is close to Vdd/2, transistor N6 becomes conductive allowing the current in the second current mirror to pass. However, since transistor P5 is fully conductive, it totally absorbs the well-defined current provided by transistor N6 through conductive transistor P6. Thus, the potential at input in could increase as far as the second high threshold level defined approximately by the threshold voltage of transistor P6 before output out passes from the low state to the high state.

Owing to the Schmitt trigger circuit, the clock signals are substantially rectangular pulse signals.

FIG. 3 shows a flow chart of the sequence of operations during the execution of the encryption programme in the microprocessor unit.

As soon as the secure integrated circuit is switched on or when a subsequent encryption programme is chosen for execution, the DES type encryption programme is executed by the microprocessor unit at step 10. It is to be noted that the encryption programme activated selection is for example achieved by an external command sent to the secure integrated circuit. A random number is read by the microprocessor unit in the register of the random number generator at step 11. This random number is loaded in register TRIM of the stage oscillator at step 12 by the microprocessor unit. The oscillator stage will thus produce clock signals whose frequency depends on the random number received. The microprocessor unit will then read another random number in the register of the random number generator at step 13 and transmit it to the timer at step 14. It is clear that the same random number could be loaded at the same time in the oscillator stage register and in the timer. During execution of the DES type encryption programme in the microprocessor unit in step 15, the timer will transmit an interruption signal at a randomly chosen instant as a function of the random number received.

As soon as the encryption programme is momentarily interrupted, a secondary routine or programme begins and a random number is read by the microprocessor unit at step 16. At step 17, this random number is loaded into register TRIM of the oscillator stage to replace a preceding random number. Thus, the oscillator stage produces clock signals whose new frequency depends on the new random number received. At step 18, another random number is read by the microprocessor unit. After such reading and as a function of the random number read, there is randomly, either a write operation in the EEPROM memory at step 19, or no write operation in the EEPROM memory at step 20. Since writing in the EEPROM memory during executed interruption routine is random which generates an additional current loss during writing, this consequently makes any encryption analysis by an unauthorised person more difficult.

After this, another random number is read by the microprocessor unit at step 21. This random number is loaded into the timer at step 22, which will change the time between each interruption signal produced by the timer. The encryption programme can again continue to be executed in the microprocessor unit after this step 22. Until said programme is completed, the interruption routine can be executed several times, but this interruption routine is not executed each time that an interruption signal is sent to the microprocessor unit.

From the description which has just been given, multiple variants of the secure integrated circuit can be conceived by those skilled in the art, without departing from the scope of the invention. For example, in the oscillator stage, the set of resistors may be replaced by a fixed resistor and the fixed capacitor may be replaced by a set of capacitors. This set of capacitors can be configured by a binary word TRIM originating from the oscillator stage register, as it was the case for the set of resistors. This binary word corresponds to a random number placed in said register.

The configuration of the set of capacitors consists in placing a certain number of capacitors that can be selected in parallel or in series owing to switching elements controlled, for example, by a voltage which is a function of binary word TRIM.

The invention claimed is:

1. A secure integrated circuit including storage means in which confidential data is stored, such as an encryption programme and at least an encryption key, a microprocessor unit for executing the encryption programme, an oscillator stage supplying clock signals for clocking the sequence of operations in the microprocessor unit, and a random number generator connected to the microprocessor unit, the oscillator stage being arranged to receive at least a random number generated by the random number generator so as to configure said oscillator stage so that it generates clock signals, whose frequency depends on the random number received, wherein the oscillator stage includes an RC type oscillator, wherein a certain number of resistors and/or capacitors can be selected by the random number introduced at the input of the oscillator stage so as to generate clock signals whose frequency depends on the RC component selected as a function of said received random number, and wherein a set of resistors is placed in series between a first current mirror, connected to a positive potential terminal of a voltage source, and a second current mirror connected to a negative potential terminal of said voltage source, the value of the resistor selected determining the value of the current to be duplicated in the first and second current mirrors.

2. The integrated circuit according to claim 1, wherein the oscillator stage receives at least a random number generated by the random number generator via the microprocessor unit.

3. The integrated circuit according to claim 1, wherein, during the execution of the encryption programme in the microprocessor unit, the oscillator stage is arranged to receive several successive random numbers at different time intervals so that the frequency of the clock signals changes as a function of each random number received.

4. The integrated circuit according to claim 1, wherein each random number, generated by the random number generator and provided to the oscillator stage, is placed in a calibrating register of said oscillator stage.

5. The integrated circuit according to claim 4, wherein a capacitor is charged or discharged by the current duplicated in the first current mirror or in the second current mirror so as to produce triangular signals, wherein a Schmitt trigger circuit is connected to the capacitor in order to provide at output clock signals with rectangular pulses as a function of the triangular signals, said clock signals controlling switching elements so that the capacitor is charged by a current duplicated in the first current mirror when the potential of the clock signals is at the low state and so that the capacitor is discharged by the current duplicated in the second current mirror when the potential of the clock signals is at the high state.

6. The integrated circuit according to claim 1, wherein it includes a timer connected to the microprocessor unit, said timer supplying at least one interruption signal to the microprocessor unit to momentarily interrupt the sequence of operations processed in the microprocessor unit.

7. The integrated circuit according to claim 6, wherein, when the encryption programme is executed in the microprocessor unit, the timer supplies several interruption signals at separate time intervals.

8. The integrated circuit according to claim 6, wherein the timer receives random numbers at separate time intervals, said random numbers being generated by the random number generator and supplied to the microprocessor unit such that the timer supplies the microprocessor unit with a certain number of interruption signals wherein the interval between each interruption signal depends on the random number received.

9. The integrated circuit according to claim 6, wherein, when the encryption programme is executed in the microprocessor unit, an interruption routine is executed as soon as at least one interruption signal is provided to the microprocessor unit so as to add instruction sequences randomly to the encryption programme, and wherein a random number is provided to the oscillator stage as soon as at least one interruption signal is transmitted to the microprocessor unit.

10. The integrated circuit according to claim 6, wherein the timer is clocked by the clock signals provided by the oscillator stage, and wherein the time interval between the interruption signals is defined by a determined number of clock signal pulses as a function of a random number received by the timer.

11. A method for activating a secure integrated circuit according to claim 1, the circuit including storage means in which confidential data is stored, such as an encryption programme and at least an encryption key, a microprocessor unit for executing the encryption programme, an oscillator stage supplying clock signals for clocking the sequence of operations in the microprocessor unit, and a random number generator connected to the microprocessor unit, the oscillator stage being arranged to receive at least a random number generated by the random number generator so as to configure said oscillator stage so that it generates clock signals, whose frequency depends on the random number received, wherein the method includes the steps of:

generating at least one random number in the random number generator, transmitting said random number generated to the oscillator stage, which includes an RC type oscillator, in which a certain number of resistors and/or capacitors can be selected by the random number introduced at the input of the oscillator stage, providing said oscillator with a set of resistors placed in series between a first current mirror, connected to a positive potential terminal of a voltage source, and a second current mirror connected to a negative potential terminal of said voltage source, the value of the resistor selected determining the value of the current to be duplicated in the first and second current mirrors, and producing clock signals in the oscillator stage whose frequency depends on the RC component selected as a function of said random number received in order to clock the sequence of operations in the microprocessor unit.

12. The method according to claim 11, wherein the microprocessor unit sends a read instruction to the generator so that it provides the microprocessor unit with at least a generated random number, and wherein the microprocessor unit transmits the random number read to the oscillator stage.

13. The method according to claim 12, wherein, when the encryption programme is executed in the microprocessor unit, several random numbers are successively generated by the generator, wherein the microprocessor unit successively reads the random numbers generated by the generator at different time intervals, and wherein each random number is successively transmitted to the oscillator stage to configure it such that it generates clock signals whose frequency changes as a function of each random number received.

14. The method according to claim 11, wherein interruption signals of the sequence of operations of the encryption programme in the microprocessor unit are provided by a timer at time intervals varying randomly as a function of a random number received and/or as a function of clock signals provided by the oscillator stage, and wherein an interruption routine is executed as soon as at least one interruption signal is provided to the microprocessor unit so as to add instruction sequences randomly to the encryption programme.

15. A secure integrated circuit including storage means in which confidential data is stored, such as an encryption programme and at least an encryption key, a microprocessor unit for executing the encryption programme, an oscillator stage supplying clock signals for clocking the sequence of operations in the microprocessor unit, and a random number generator connected to the microprocessor unit, the oscillator stage being arranged to receive at least a random number generated by the random number generator so as to configure said oscillator stage so that it generates clock signals, whose frequency depends on the random number received, wherein the oscillator stage includes an RC type oscillator, and wherein a certain number of resistors and/or capacitors can be selected by the random number introduced at the input of the oscillator stage so as to generate clock signals whose frequency depends on the RC component selected as a function of said received random number, wherein a set of resistors is placed in series between a first current mirror, connected to a positive potential terminal of a voltage source, and a second current mirror connected to a negative potential terminal of said voltage source, the value of the resistor selected determining the value of the current to be duplicated in the first and second current mirrors, wherein a capacitor is charged or discharged by the current duplicated in the first current mirror or in the second current mirror so as to produce triangular signals, and wherein a Schmitt trigger circuit is connected to the capacitor in order to provide at output clock signals with rectangular pulses as a function of the triangular signals, said clock signals controlling switching elements so that the capacitor is charged by a current duplicated in the first current mirror when the potential of the clock signals is at the low state and so that the capacitor is discharged by the current duplicated in the second current mirror when the potential of the clock signals is at the high state.

16. The integrated circuit according to claim 15, wherein each random number, generated by the random number generator and provided to the oscillator stage, is placed in a calibrating register of said oscillator stage.

* * * * *